April 21, 1953  D. W. MOORE, JR  2,635,460
PNEUMATIC DENSITY-RESPONSIVE APPARATUS
Filed Feb. 27, 1947
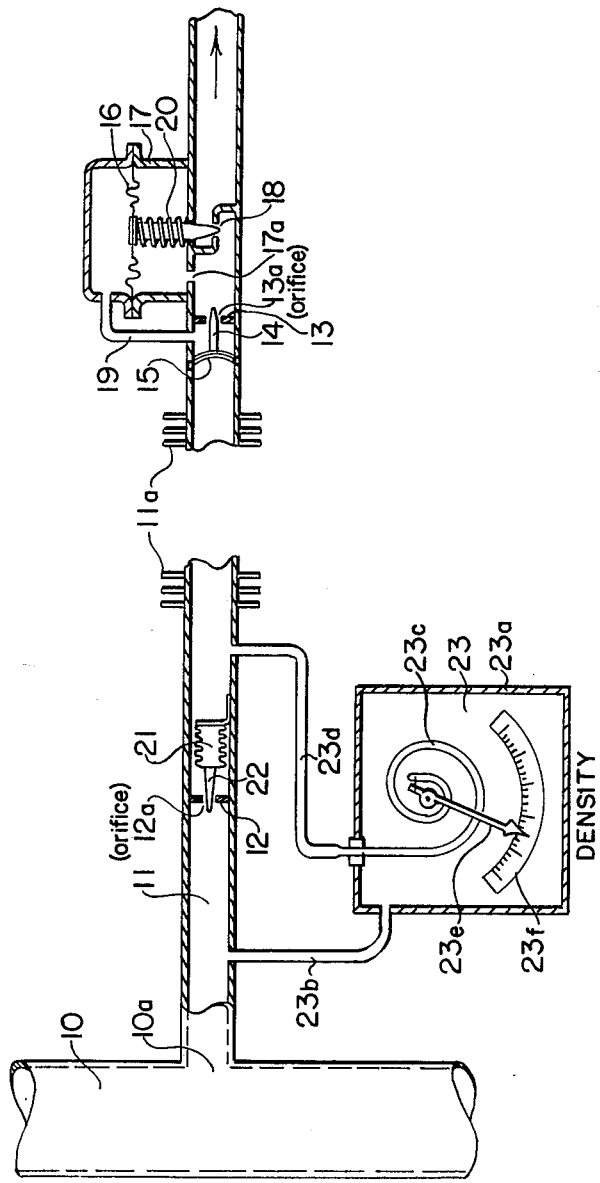
INVENTOR.
DAVID W. MOORE, Jr.
BY
Lawrence B. Dodds Patented Apr. 21, 1953

2,635,460

UNITED STATES PATENT OFFICE 2,635,460

PNEUMATIC DENSITY-RESPONSIVE APPARATUS

David W. Moore, Jr., New York, N. Y., assignor to Fairchild Camera and Instrument Corporation, a corporation of Delaware Application February 27, 1947, Serial No. 731,203

8 Claims. (Cl. 73—30)

This invention relates to pneumatic density-responsive apparatus and, while it is of general application, it is particularly adapted to the measurement of the density of an elastic fluid at a temperature so high that ordinary measuring apparatus is inapplicable, for example, to the measurement of the density of combustion gases in an internal-combustion gas turbine.

In applicant's copending application, Serial No. 604,867, filed July 13, 1945, entitled "Elastic-Fluid Temperature-Responsive System," assigned to the same assignee as the present application, there is described and claimed a pneumatic temperature-responsive apparatus utilizing the basic principles of Boyle's Law combined with Gay Lussac's or Charles' Law; namely, that for any given mass of perfect gas the following equation is satisfied under all conditions of temperature, volume, and pressure:

$$PV = RT \qquad (1)$$

where $P$ = absolute pressure of the gas
$V$ = volume of the gas
$T$ = temperature of the gas
$R$ = the gas constant.

In the system of that application, a quantity of high-temperature elastic fluid is extracted from its container, cooled, and its mass flow measured, regulated, or otherwise determined and it is shown that the volumetric flow of the hot gas through a metering orifice, as determined by the differential pressure across said orifice, is representative of a temperature factor of the hot fluid. If the high-side orifice pressure is maintained constant, such differential pressure is representative of the actual temperature of the fluid on a properly calibrated scale.

The present invention relates to a modification of the temperature-responsive apparatus of aforesaid copending application, utilizing direct-acting condition responsive elements for developing an effect representative of the density of the high-temperature elastic fluid.

It is an object of the present invention, therefore, to provide a new and improved pneumatic density-responsive apparatus of simple, economical, and rugged construction.

It is another object of the invention to provide a new and improved pneumatic density-responsive apparatus in which the controlling or regulating operations are effected by direct-acting mechanisms responsive to the several primary conditions, thus avoiding the necessity of auxiliary servo mechanisms.

In accordance with the invention, there is provided a pneumatic apparatus responsive to the density of an elastic fluid which comprises a conduit for conducting a flow of the elastic fluid, a first constriction in the conduit, a second constriction in the conduit spaced from the first constriction, and heat-exchanger means for changing the temperature of the fluid in its flow between such constrictions. The apparatus further includes means for compensating the effective area of the second constriction to maintain substantially constant the ratio of the square of the effective area thereof to the temperature thereat, means for maintaining substantially constant the differential pressure across the second constriction, and means for maintaining substantially constant the ratio of the low-side pressure at the first constriction to the square of the effective area thereof, whereby the differential pressure across the first constriction is representative of the fluid density at the high-pressure side thereof.

For a better understanding of the present invention, together with other and further objects thereof, reference is had to the following description taken in connection with the accompanying drawing, and its scope will be pointed out in the appended claims.

Referring now to the single figure of the drawing, there is illustrated, partially schematically, a pneumatic density-responsive apparatus embodying the invention for measuring the density of a high-temperature elastic fluid in a container.

Referring now more specifically to the drawing, there is represented a pneumatic apparatus responsive to the density of a high-temperature elastic fluid in a container 10, which may be a portion of the gas chamber of an internal-combustion gas turbine. This apparatus includes a conduit 11 adapted for connection with the container at the point 10a to conduct a flow of the elastic fluid from the container and exhaust it into the atmosphere. Disposed in the conduit 11 in the vicinity of the container 10 is an orifice plate 12 having a central constriction or orifice 12a through which the elastic fluid from the container 10 flows.

The density-responsive apparatus of the invention also includes means for maintaining the fluid mass flow through the conduit 11 substantially constant. This means may comprise a second orifice plate 13 having a central constriction or orifice 13a. The orifice plate 13 is spaced from the orifice plate 12 by a substantial distance, as indicated by the broken portion of the conduit 11. There is provided heat-exchanger means for changing the temperature of the elastic fluid in its flow between the orifices 12a and 13a. If the length of the conduit 11 between these two orifices is sufficient, the conduit alone may act as cooling means for reducing the temperature of the fluid at the orifice 13a. However, if the cooling effect of the conduit 11 is insufficient for this purpose, conventional cooling means such as cooling fins 11a may be added.

The means for maintaining the fluid mass flow constant is associated with the second orifice 13a and comprises means for compensating the orifice to maintain substantially constant the ratio of the square of the effective area thereof to the temperature at the orifice. This means may be in he form of a tapered plug 14 associated with the orifice 13a and a bi-metallic strip 15 disposed in the conduit near the orifice 13a and connected to actuate the plug 14. The tapered plug 14 is designed with a configuration so related to the characteristic of the bi-metallic strip 15 as to vary the effective area of the orifice in such manner as to maintain the desired ratio described.

The means for maintaining constant the mass flow through the conduit 11 further includes means for maintaining substantially constant the differential pressure across the orifice 13a. This means may be in the form of a differential pressure diaphragm 16 mounted in a generally cylindrical chamber 17 and connected to a valve 18 in the conduit 11 beyond the orifice 13a in the direction of fluid flow. The lower side of the diaphragm 16 is exposed to the low-side pressure at the orifice 13a through a port 17a, while the upper side of the diaphragm 16 is exposed to the pressure at the high-pressure side of orifice 13a through a conduit 19. The diaphragm 16 is suitably biased by a spring 20 to compensate for the normal differential pressure across the orifice 13a.

The density-responsive apparatus of the invention further includes means for maintaining substantially constant the ratio of the low-side pressure at the orifice 12a to the square of the effective area thereof. This means may be in the form of a pressure-responsive means, such as a sealed pressure capsule 21, disposed in the conduit 11 adjacent the orifice 12a and connected to actuate a tapered plug 22 extending through the orifice 12a. The plug 22 is designed to have a taper or configuration related to the characteristic of the pressure-responsive capsule 21 to vary the effective area of the orifice in such manner as to maintain the desired ratio described.

As explained in detail hereinafter, with the relationships described above, the differential pressure across the orifice 12a is representative of the fluid density of the high-temperature fluid at the high-pressure side of the orifice 12a. Therefore, a differential pressure-responsive device may be connected across the orifice 12a for developing an effect representative of such density. This device may be in the form of a differential pressure gauge 23 comprising a casing 23a connected to the high-pressure side of the orifice 12a by means of a conduit 23b and enclosing a Bourdon tube 23c connected to the low-pressure side of the orifice 12a by way of a conduit 23d. The gauge 23 includes a pointer 23e attached to and actuated by the Bourdon tube 23c and co-operating with a scale 23f calibrated to indicate directly in terms of fluid density.

The operation of the density-responsive apparatus described may be best understood by considering certain fundamental relationships. It can be shown by fundamental thermodynamic principles that the fluid mass flow of elastic fluid through the orifices 12a and 13a is represented by the equation:

$$W = C_1 A_1 \sqrt{(P_1-P_2)D_1} = C_2 A_2 \sqrt{\frac{(P_2-P_3)P_3}{T_2}} \quad (2)$$

where $W$ = fluid mass flow
$A_1$ = effective area of orifice 12a
$A_2$ = effective area of orifice 13a
$P_1 - P_2$ = differential pressure across orifice 12a
$P_2 - P_3$ = differential pressure across orifice 13a
$D_1$ = fluid density at high pressure side of orifice 12a
$C_1, C_2$ = constants including the gas constant R of elastic fluid and the orifice constants of the orifices 12a and 13a Equation 2 may be transformed to:

$$D_1 = \frac{C_2}{C_1} \frac{(P_2-P_3) \times (A_2)^2 \times P_3}{(P_1-P_2) \times (A_1)^2 \times T_2} \quad (3)$$

As described above, the configuration of the tapered plug 22 is such that the ratio of the pressure $P_2$ at the low-pressure side of its associated orifice 12a to the square of the effective area thereof is maintained substantially constant, that is:

$$\frac{P_2}{(A_1)^2} = \text{Constant} \quad (4)$$

In instrumenting the solution of Equation 3, it will be assumed that the orifices 12a and 13a are so proportioned that the differential pressure $P_2 - P_3$ across the orifice 13a is sufficiently small that the ration $P_2/P_3$ is substantially unity.

Therefore, Equation 4 may be written:

$$\frac{P_3}{(A_1)^2} = \text{Constant} \quad (5)$$

As described above, the taper or configuration of the plug 14 is so related to the characteristic of the bi-metallic strip 15 that:

$$\frac{(A_2)^2}{T_2} = \text{Constant} \quad (6)$$

Also, the differential-pressure device 16, 17, 18 is effective to maintain constant the differential pressure $P_2 - P_3$ across orifice 13a so that:

$$P_2 - P_3 = \text{Constant} \quad (7)$$

Substituting Equations 5, 6, and 7 in Equation 3 gives:

$$D_1 = \frac{1}{C(P_1-P_2)} \quad (8)$$

In other words, the differential pressure across the orifice 12a is representative of, specifically inversely proportional to, the density of the elastic fluid at the high-pressure side of orifice 12a. Therefore, this differential pressure applied to the differential pressure gauge 23 is effective to give directly an indication of fluid density and, by a proper calibration of the scale 23f, the gauge 23 may be made to read directly in terms of fluid density.

While there has been described what is at present considered to be the preferred embodiment of this invention, it will be obvious to those skilled in the art that various changes and modifications may be made therein without departing from the invention, and it is, therefore, aimed in the appended claims to cover all such changes and mod-

What is claimed is:
1. A pneumatic apparatus responsive to the density of an elastic fluid comprising, a conduit for conducting a flow of said elastic fluid, a first orifice in said conduit, a second orifice in said conduit spaced from said first orifice, heat exchanger means for changing the temperature of said fluid in its flow between said orifices, means for compensating the effective area of said second orifice to maintain substantially constant the ratio of the square of the effective area thereof to the temperature thereat, means for maintaining substantially constant the differential pressure across said second orifice, and means for maintaining substantially constant the ratio of the low-side pressure at said first orifice to the square of the effective area thereof, whereby the differential pressure across said first orifice is representative of the fluid density at the high-pressure side thereof.

2. A pneumatic apparatus responsive to the density of a high-temperature elastic fluid in a container comprising, a conduit adapted for fluid connection with said container, a first constriction in said conduit in the vicinity of said container, a second constriction in said conduit spaced from said first constriction, means for cooling said fluid in its flow between said constrictions to a measurable temperature, means for compensating the effective area of said second constriction to maintain substantially constant the ratio of the square of the effective area thereof to the temperature thereat, means for maintaining substantially constant the differential pressure across said second constriction, and means for maintaining substantially constant the ratio of the low-side pressure at the first constriction to the square of the effective area thereof, whereby the differential pressure across said first constriction is representative of the fluid density.

3. A pneumatic apparatus responsive to the density of an elastic fluid comprising, a conduit for conducting a flow of said elastic fluid, a first constriction in said conduit, a second constriction in said conduit spaced from said first constriction, heat exchanger means for changing the temperature of said fluid in its flow between said constrictions, means for compensating the effective area of said second constriction to maintain substantially constant the ratio of the square of the effective area thereof to the temperature thereat, means for maintaining substantially constant the differential pressure across said second constriction, and means for maintaining substantially constant the ratio of the low-side pressure at said first constriction to the square of the effective area thereof, whereby the differential pressure across said first constriction is representative of the fluid density at the high-pressure side thereof.

4. A pneumatic apparatus responsive to the density of an elastic fluid comprising, a conduit for conducting a flow of said elastic fluid, a first orifice in said conduit, a second orifice in said conduit spaced from said first orifice, heat exchanger means for changing the temperature of said fluid in its flow between said orifices, a tapered plug associated with said second orifice, a bi-metallic strip disposed in said conduit and connected to actuate said plug, said plug having a configuration so related to the characteristic of said strip as to maintain substantially constant the ratio of the square of the effective area of said second orifice to the temperature thereat, means for maintaining substantially constant the differential pressure across said second orifice, and means for maintaining substantially constant the ratio of the low-side pressure at said first orifice to the square of the effective area thereof, whereby the differential pressure across said first orifice is representative of the fluid density at the high-pressure side thereof.

5. A pneumatic apparatus responsive to the density of an elastic fluid comprising, a conduit for conducting a flow of said elastic fluid, a first orifice in said conduit, a second orifice in said conduit spaced from said first orifice, heat exchanger means for changing the temperature of said fluid in its flow between said orifices, a tapered plug associated with said second orifice, a bi-metallic strip disposed in said conduit and connected to actuate said plug, said plug having a configuration so related to the characteristic of said strip as to maintain substantially constant the ratio of the square of the effective area of said second orifice to the temperature thereat, means for maintaining substantially constant the differential pressure across said second orifice, a tapered plug associated with said first orifice, and pressure-responsive means disposed in said conduit and connected to actuate said plug, said plug having a configuration so related to the characteristic of said pressure-responsive means as to maintain substantially constant the ratio of the low-side pressure at said first orifice to the square of the effective area thereof, whereby the differential pressure across said first orifice is representative of the fluid density at the high-pressure side thereof.

6. A pneumatic apparatus responsive to the density of an elastic fluid comprising, a conduit for conducting a flow of said elastic fluid, a first orifice in said conduit, a second orifice in said conduit spaced from said first orifice, heat exchanger means for changing the temperature of said fluid in its flow between said orifices, a tapered plug associated with said second orifice, a bi-metallic strip disposed in said conduit and connected to actuate said plug, said plug having a configuration so related to the characteristic of said strip as to maintain substantially constant the ratio of the square of the effective area of said second orifice to the temperature thereat, means for maintaining substantially constant the differential pressure across said second orifice, a tapered plug associated with said first orifice, and a sealed pressure capsule disposed in said conduit and connected to actuate said plug, said plug having a configuration so related to the characteristic of said sealed pressure capsule as to maintain substantially constant the ratio of the low-side pressure at said first orifice to the square of the effective area thereof, whereby the differential pressure across said first orifice is representative of the fluid density at the high-pressure side thereof.

7. A pneumatic apparatus responsive to the density of an elastic fluid comprising, a conduit for conducting a flow of said elastic fluid, a first constriction in said conduit, a second constriction in said conduit spaced from said first constriction, heat exchanger means for changing the temperature of said fluid in its flow between said constrictions, means for compensating the effective area of said second constriction to maintain substantially constant the ratio of the square of the effective area thereof to the temperature thereat, means for maintaining substantially constant the differential pressure across said second constriction, means for maintaining substantially constant the ratio of the low-side pressure at said first constriction to the square of the effective area thereof, and a differential-pressure responsive device connected across said first constriction for developing an effect representative of the fluid density at the high-pressure side thereof.

8. A pneumatic apparatus responsive to the density of an elastic fluid comprising, a conduit for conducting a flow of said elastic fluid, a first constriction in said conduit, a second constriction in said conduit spaced from said first constriction, heat exchanger means for changing the temperature of said fluid in its flow between said constrictions, means for compensating the effective area of said second constriction to maintain substantially constant the ratio of the square of the effective area thereof to the temperature thereat, means for maintaining substantially constant the differential pressure across said second constriction, means for maintaining substantially constant the ratio of the low-side pressure at said first constriction to the square of the effective area thereof, and a differential-pressure indicator connected across said first constriction and having a scale calibrated to read directly in terms of the fluid density at the high-pressure side of said first constriction.

DAVID W. MOORE, Jr.

References Cited in the file of this patent

UNITED STATES PATENTS

| Number | Name | Date |
|---|---|---|
| 1,530,222 | Weymouth et al. | Mar. 17, 1925 |
| 2,217,642 | Luhrs | Oct. 8, 1940 |
| 2,345,272 | Luhrs | Mar. 28, 1944 |

FOREIGN PATENTS

| Number | Country | Date |
|---|---|---|
| 456,836 | Great Britain | Aug. 13, 1935 |

OTHER REFERENCES

"Fluid Flow Through Two Orifices in Series," by Stuart & Varnall. Published in Mechanical Engineering, vol. 58, Issue No. 8, pages 479–484, August 1936.